US008275884B2

(12) United States Patent
Hwang et al.

(10) Patent No.: US 8,275,884 B2
(45) Date of Patent: Sep. 25, 2012

(54) METHOD AND SYSTEM FOR SECURELY SHARING CONTENT

(75) Inventors: Joo-Young Hwang, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 12/333,692

(22) Filed: Dec. 12, 2008

(65) Prior Publication Data

US 2009/0182860 A1   Jul. 16, 2009

(30) Foreign Application Priority Data

Jan. 15, 2008  (KR) ........................ 10-2008-0004458

(51) Int. Cl.
*H04L 12/28* (2006.01)
*H04L 12/56* (2006.01)
*H04L 29/06* (2006.01)
*H04L 12/14* (2006.01)
*G06F 15/16* (2006.01)
*G06F 15/177* (2006.01)
*G06F 15/173* (2006.01)
*G06F 12/00* (2006.01)
*G06F 9/34* (2006.01)
*G06F 17/00* (2006.01)
*G06F 9/00* (2006.01)
*G06F 7/04* (2006.01)

(52) U.S. Cl. ........ 709/225; 709/204; 709/205; 709/213; 709/215; 709/217; 709/223; 709/224; 709/230; 370/255; 370/389; 370/419; 711/102; 711/103; 711/114; 711/143; 711/152; 711/155; 711/156; 711/159; 711/163; 711/206; 711/207; 711/209; 713/150; 713/165; 713/168; 713/193; 726/1; 726/11; 726/12; 726/14; 726/21; 726/26; 726/27

(58) Field of Classification Search ........................ None
See application file for complete search history.

(56) References Cited

U.S. PATENT DOCUMENTS

| | | | | | |
|---|---|---|---|---|---|
| 4,733,349 | A | * | 3/1988 | Sumiyoshi et al. | 711/159 |
| 4,742,215 | A | * | 5/1988 | Daughters et al. | 235/487 |
| 4,926,476 | A | * | 5/1990 | Covey | 711/163 |
| 5,325,499 | A | * | 6/1994 | Kummer et al. | 711/143 |
| 5,566,302 | A | * | 10/1996 | Khalidi et al. | 719/312 |
| 5,579,529 | A | * | 11/1996 | Terrell et al. | 710/8 |
| 5,924,126 | A | * | 7/1999 | Rosenthal et al. | 711/207 |
| 5,987,506 | A | * | 11/1999 | Carter et al. | 709/213 |
| 6,049,672 | A | * | 4/2000 | Shiell et al. | 717/168 |
| 6,622,231 | B2 | * | 9/2003 | Kaufman et al. | 711/209 |
| 7,020,152 | B1 | * | 3/2006 | Doi et al. | 370/419 |
| 7,185,066 | B2 | * | 2/2007 | Noble et al. | 709/217 |
| 7,233,946 | B1 | * | 6/2007 | McPolin | 1/1 |

(Continued)

FOREIGN PATENT DOCUMENTS

JP        2006209688 A     8/2006

(Continued)

*Primary Examiner* — Ho Shiu
(74) *Attorney, Agent, or Firm* — Sughrue Mion, PLLC

(57) ABSTRACT

A method and apparatus for securely sharing content are provided, which can securely share the content without allowing access by unauthorized third parties. The method of securely sharing content includes a first domain, which has content that requires security among a plurality of domains logically generated on a hardware platform, sharing the content with at least one second domain, and if the second domain intends to write the content in a region in which writing is not permitted, preventing the writing of the content.

22 Claims, 2 Drawing Sheets

U.S. PATENT DOCUMENTS

| | | | |
|---|---|---|---|
| 7,251,327 B1* | 7/2007 | Sako et al. | 380/201 |
| 7,263,575 B2* | 8/2007 | Oguri et al. | 711/103 |
| 7,299,277 B1* | 11/2007 | Moran et al. | 709/224 |
| 7,320,033 B2* | 1/2008 | Bradfield et al. | 709/225 |
| 7,665,077 B2* | 2/2010 | Mariani et al. | 717/148 |
| 7,725,558 B2* | 5/2010 | Dickenson | 709/215 |
| 7,814,554 B1* | 10/2010 | Ragner | 726/27 |
| 2002/0069365 A1* | 6/2002 | Howard et al. | 713/201 |
| 2003/0009271 A1* | 1/2003 | Akiyama | 701/33 |
| 2003/0217105 A1* | 11/2003 | Zircher et al. | 709/205 |
| 2003/0226029 A1* | 12/2003 | Porter et al. | 713/200 |
| 2004/0083263 A1* | 4/2004 | Richardson et al. | 709/204 |
| 2004/0184057 A1* | 9/2004 | Nakabayshi et al. | 358/1.9 |
| 2004/0186965 A1* | 9/2004 | Yap et al. | 711/154 |
| 2004/0215909 A1* | 10/2004 | Imai et al. | 711/163 |
| 2005/0050357 A1* | 3/2005 | Jeng et al. | 713/201 |
| 2005/0066335 A1* | 3/2005 | Aarts | 719/316 |
| 2005/0120187 A1* | 6/2005 | Suzuoki et al. | 711/156 |
| 2005/0120232 A1* | 6/2005 | Hori et al. | 713/193 |
| 2005/0132221 A1* | 6/2005 | Marcjan | 713/201 |
| 2005/0177853 A1* | 8/2005 | Williams et al. | 725/81 |
| 2005/0229245 A1* | 10/2005 | Nakano et al. | 726/14 |
| 2006/0069911 A1* | 3/2006 | Takabayashi et al. | 713/150 |
| 2006/0075024 A1* | 4/2006 | Zircher et al. | 709/205 |
| 2006/0117178 A1* | 6/2006 | Miyamoto et al. | 713/165 |
| 2006/0127037 A1* | 6/2006 | Van Hoff et al. | 386/83 |
| 2006/0136910 A1 | 6/2006 | Brickell et al. | |
| 2006/0149683 A1* | 7/2006 | Shimojima et al. | 705/59 |
| 2006/0165078 A1* | 7/2006 | Gopinath et al. | 370/389 |
| 2006/0195902 A1* | 8/2006 | King et al. | 726/21 |
| 2006/0224542 A1* | 10/2006 | Yalamanchi | 706/47 |
| 2007/0002769 A1* | 1/2007 | Matityahu et al. | 370/255 |
| 2007/0016734 A1* | 1/2007 | Asauchi | 711/154 |
| 2007/0039039 A1* | 2/2007 | Gilbert et al. | 726/4 |
| 2007/0199063 A1* | 8/2007 | Howard et al. | 726/12 |
| 2007/0255787 A1* | 11/2007 | Richardson et al. | 709/204 |
| 2007/0269044 A1* | 11/2007 | Bruestle | 380/54 |
| 2008/0091900 A1* | 4/2008 | Imai et al. | 711/163 |
| 2009/0006717 A1* | 1/2009 | Rothman et al. | 711/102 |
| 2009/0013134 A1* | 1/2009 | Chen et al. | 711/152 |
| 2009/0083520 A1* | 3/2009 | Kanemura | 712/43 |
| 2010/0088699 A1* | 4/2010 | Sasaki | 718/1 |
| 2011/0145916 A1* | 6/2011 | McKenzie et al. | 726/19 |

FOREIGN PATENT DOCUMENTS

| | | |
|---|---|---|
| JP | 2007058749 A | 3/2007 |
| KR | 1020040028704 A | 4/2004 |

* cited by examiner

METHOD AND SYSTEM FOR SECURELY SHARING CONTENT

CROSS-REFERENCE TO RELATED APPLICATION

This application is based on and claims priority from Korean Patent Application No. 10-2008-0004458 filed on Jan. 15, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to securely sharing content, and, more particularly, to securely sharing content without allowing the unauthorized external parties to receive the content.

2. Description of the Related Art

Various electronic devices, such as a mobile communication terminal, a portable computer, a PDA, and so forth, require accesses to security-related elements, such as an application program, an encryption key, encryption key data, a result of an intermediate encryption calculation, a password, authentication of external downloaded data, and so forth. Generally, such elements and the processing thereof should be secretly managed in the electronic devices. Ideally, these elements should be known by a minimum number of people.

Accordingly, a secure execution environment is introduced, and in this environment, a processor in the electronic device can access the security-related elements.

Application program providers encrypt programs in order to generate tamper resistant software. Only when an application program code is executed in a secure environment can the code be decrypted to be managed as ordinary text.

"Architectural Support for Copy and Tamper Resistant Software", David Lie et al., published during the $7^{th}$ International Conference on Architectural Support for Programming Language and Operating System, held in November 2000, discloses a system called XOM (eXecute Only Memory). Each XOM processor includes a pair of public/secret keys. The secret key is preserved in hardware, is known by the processor, but is not known by the owner of the processor or anyone else. XOM software is encrypted by a pair of public/secret keys when it is purchased. Just before the execution of the software, an executable code is decrypted by the processor, and an ordinary text code never remains in the processor chip. In a structure of this type, general data is encrypted, and a common shared key is used to share the encrypted data among different application programs. In this case, it may be possible for the decrypted data to be known by external parties.

For example, in the case where a user intends to print or display data through an access to a computer for common use, the computer may be infected with virus, and this may cause the data to be known by external parties.

In contrast, in the case where an anonymous user intends to modify his/her data by using a public edit program on the Internet, the program may include a virus or may be malicious software, and this may allow external parties to access the data.

SUMMARY OF THE INVENTION

Accordingly, the present invention has been made to address the above-mentioned problems occurring in the prior art, and an aspect of the present invention is to provide a method and apparatus for securely sharing content without allowing the content to pass to unauthorized external parties.

Additional advantages and features of the invention will be set forth in part in the description which follows and in part will become apparent to those having ordinary skill in the art upon examination of the following or may be learned from practice of the invention.

The present disclosure provides a method of securely sharing content. According to exemplary embodiments of the present invention, a method includes a first domain, which has content that requires security among a plurality of domains logically generated on a hardware platform, sharing the content with at least one second domain; and if the second domain intends to write the content in a region in which writing of the content is not permitted, preventing the writing of the content.

In another aspect of the present invention, there is provided a system for securely sharing content, which includes a virtualization layer unit which logically generates a plurality of domains on a hardware platform; wherein the plurality of domains include a first domain having content that requires security and at least one second domain that shares the content with the first domain; and wherein if the second domain intends to write the content in a region in which writing of the content is not permitted, the virtualization layer unit prevents the writing of the content.

BRIEF DESCRIPTION OF THE DRAWINGS

The above and other objects, features and advantages of the present invention will be apparent from the following detailed description taken in conjunction with the accompanying drawings, in which.

DETAILED DESCRIPTION OF EXEMPLARY EMBODIMENTS

Figure 1:
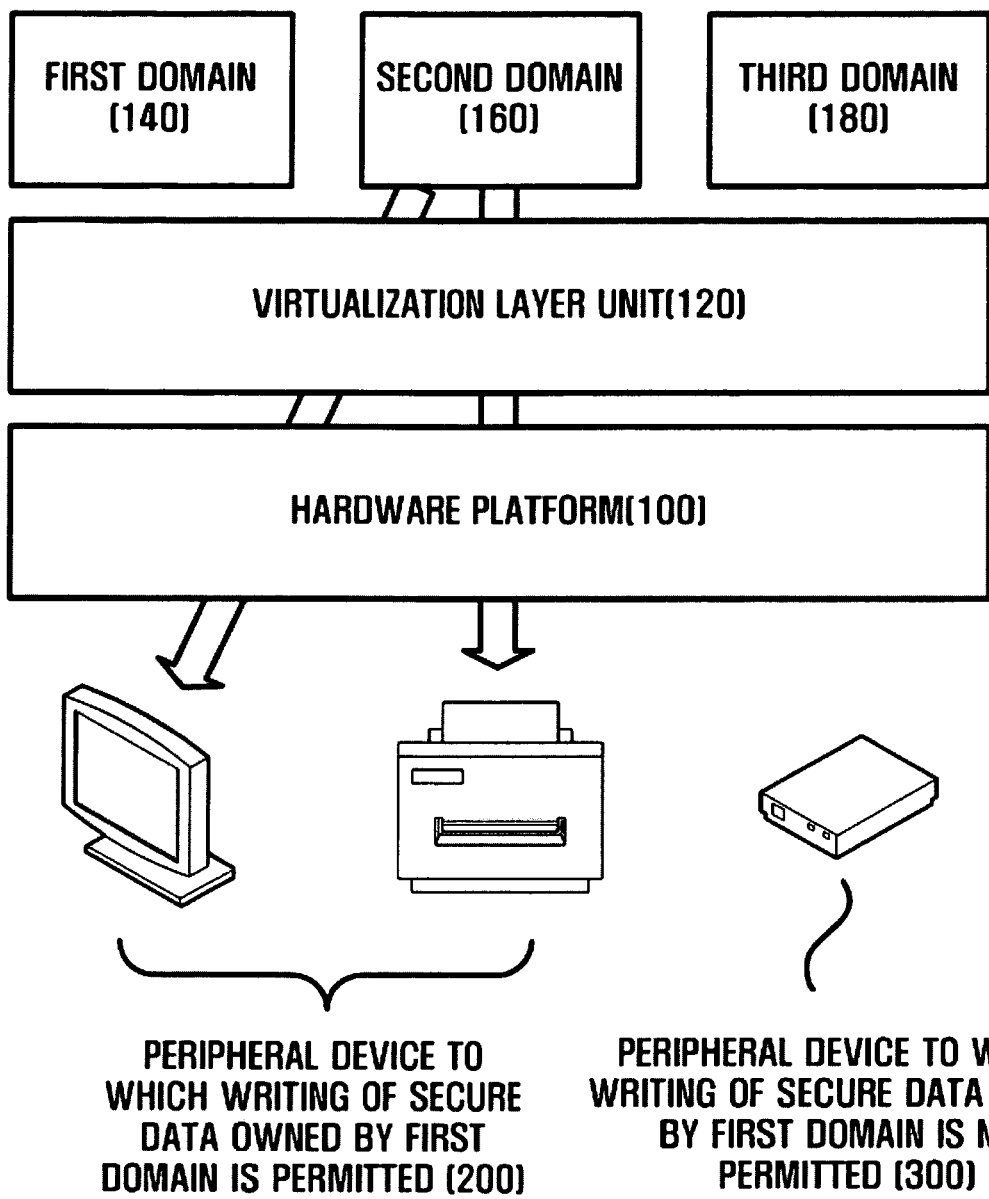
FIG. 1 is a block diagram schematically illustrating the construction of a system for securely sharing content according to an exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts for explaining a method and apparatus for securely sharing content according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram schematically illustrating the construction of a system for securely sharing content according to an embodiment of the present invention.

Virtualization technology is technology that makes it possible to drive a plurality of operating systems on a hardware platform. Specifically, virtualization technology employs a virtual machine monitor (VMM) or a hypervisor that directly provides a virtualization layer, and serves to generate a plurality of logical virtual machines (VMs) on the virtualization layer. The plurality of virtual machines construct a plurality of domains, and the plurality of domains are provided with different operating systems mounted thereon to operate the operating systems. In the respective operating systems, programs supported by the corresponding operating systems can be installed.

The system for securely sharing content according to an embodiment of the present invention is based on such virtualization technology, and may be used to receive a service from an application of a common computer or a peripheral device or to receive a service from an application downloaded to a personal computer.

The system for securely sharing content according to an embodiment of the present invention includes a hardware platform 100, a virtualization layer unit 120, and a plurality of domains 140, 160, and 180 generated on the virtualization layer unit 120. Here, the content may be, but is not limited to, an image file or a video file.

For explanatory convenience, the respective domains as illustrated in FIG. 1 are called "a first domain 140", "a second domain 160", and "a third domain 180".

It is assumed that the first domain 140 has a user's private content that requires security (hereinafter referred to as "secure data"), the second domain 160 can share the secure data of the first domain 140, and the third domain 180 cannot share the secure data of the first domain 140. Here, the third domain 180, from a standpoint of the first domain 140, is a domain that provides no service to the first domain 140. It may be assumed that the second domain 160 and the third domain 180 have their own secure data and share or do not share the secure data with the remaining domains. However, for explanatory convenience, such an assumption is not considered in the embodiment of the present invention.

Here, the secure data may be, but is not limited to, content directly prepared by a user. The secure data may be permanent data stored in a storage device or volatile data which is not stored in the storage device, but exists only in the memory of the system.

The hardware platform 100 means an actual hardware device that includes a CPU (Central Processing Unit), a memory, an input/output (I/O) port, a storage device, and so forth.

The virtualization layer unit 120 may be, but is not limited to, a virtual machine monitor or a hypervisor that serves to generate various virtual hardware platforms on a hardware platform 100 and to show the generated virtual hardware platforms to the operating system.

The first domain 140 has the secure data. Since the first domain 140 takes charge of the user's file service, it can also serve as a file server virtual machine (FSVM).

An FSVM code for accessing the storage device, in which the secure data of the first domain 140 is stored, is loaded in the memory and executed when the storage device is connected to the computer.

The virtualization layer unit 120 prohibits any device except for the FSVM from accessing the corresponding storage device.

Accordingly, the second domain 160 and the third domain 180 cannot directly access the secure data of the first domain 140 that is stored in the storage device. However, other domains can access the secure data of the first domain 140 in a manner that the FSVM loads the secure data of the first domain 140 that is stored in the storage device in the FSVM memory and then shares the loaded secure data with other domains. In this case, the domains that share the secure data of the first domain 140 are limited to the domains having peer relations with the first domain 140 (in this embodiment of the present invention, the second domain 160). Details of the peer relations will be described later.

With respect to the memory region shared between the different domains (i.e., the first domain 140 and the second domain 160) having peer relations with each other, the FSVM requests the virtualization layer unit 120 to mark pages of the shared memory so that the pages indicate that the secure data is stored therein (hereinafter, the mark is called a "page mark"). Also, respective page descriptors have an ID of the domain (e.g., the first domain 140), to which the marked pages belong, as a tag (hereinafter referred to as a "page tag").

When the secure data stored in the marked pages is loaded on processor registers, the respective register also has a mark indicating that the secure data is stored (hereinafter referred to as a "register mark") and a tag having the ID of the first domain 140 that is the domain having the secure data (hereinafter referred to as a "register tag").

Accordingly, the page mark, the page tag, the register mark, and the register tag are used as indexes capable of confirming checking that the secure data is stored and domains that have the secure data.

In contrast, memory information shared among the domains is managed by the virtualization layer unit 120 as a memory sharing information table. The memory sharing information table includes information on domains that are permitted to access the shared memory pages.

The virtualization layer unit 120 remembers the first domain 140 that has requested the marking of the respective pages of the memory shared by the first domain 140 and the second domain 160, and if another domain (e.g., the second domain 160 or the third domain 180) intends to mark the page of which the marking is requested, the virtualization layer unit 120 does not permit the marking. If the marking is permitted, the following problems may occur. If the first domain 140 that has the corresponding secure data for the marked page requests an outflow of the secure data, the virtualization layer unit 120 permits such an outflow of the secure data. In this case, if another domain (e.g., the second domain 160 or the third domain 180) intends to mark the page of which the marking is requested and the virtualization layer unit 120 permits this marking, another domain (e.g., the second domain 160 or the third domain 180) may freely make the data that the domain does not have into its own data, and make the data flow to an external source. Accordingly, it is preferable that the virtualization layer unit 120 does not permit the change of the domain having the marked secure data.

In addition, the virtualization layer unit 120 may provide a hypercall for forming mutual peer relations among the above-described domains, and set up master-slave relations when the mutual peer relations are formed.

In the hypercall process for forming the peer relations among the domains, the respective domains inform the virtualization layer unit 120 of external transmission types that are not permitted to write the secure data owned by the domains. Paths for transmitting data to the outside may correspond to a general display, an output through a printer, a transmission through a network, and so forth. In contrast, data reproduction from a system memory connected to a processor does not correspond to the external transmission. Accordingly, the external transmission types may be classified into three types of printing, displaying, and networking, but are not limited thereto. In contrast, in the case of outputting data through a network such as a remote printer or a remote display, it may correspond to the networking type. Accordingly, if writing is not permitted to the network type, it is not possible to output data to the remote printer or the remote display, which is not a local printer or a local display.

The virtualization layer unit 120 operates to set flags (hereinafter referred to as "write-prevention flags") in memory page descriptors of the peripheral devices (300) that correspond to the external transmission type to which writing is not permitted, as opposed to the peripheral devices to which writing of secure data owned by the first domain is permitted (200). The write-prevention flag means that the corresponding page indicates the memory region of the peripheral device in which writing of the secure data is not permitted, and the peripheral devices that correspond to the external transmission type may be a local printer as a peripheral device corresponding to a printing type, a local display as a peripheral device corresponding to a displaying type, a remote printer or a remote display as peripheral devices corresponding to a networking type, and so forth. Also, the peripheral devices in which writing of the secure data is not permitted may be, but are not limited to, devices shared by the third domain 180 that do not have the peer relations with the first domain 140.

If the second domain 160 intends to transmit the secure data of the first domain 140 to the respective peripheral devices connected to the system in a state that the second domain 160 has peer relations with the first domain 140 and shares the secure data of the first domain 140, the processor checks whether the write-prevention flag is set in the memory page descriptor of the corresponding peripheral device. Here, if the write-prevention flag is set, the transmission of the secure data is prevented.

The virtualization layer unit 120 manages a peer pair information table on which information on domains having the peer relations with one another is recorded. The peer pair information table may include information on which domain among the domains having the peer relations is a master, and list information of external transmission types to which the writing designated by the domain having the secure data is not permitted.

If the second domain 160 requests the third domain 180 to share the page including the secure data of the first domain 140, the virtualization layer unit 120 does not permit it. Also, if the second domain 160 intends to write the secure data of the first domain in the memory shared with the third domain 180 on the assumption that the first domain 140 and the second domain 160 have peer relations with each other and the second domain 160 and the third domain 180 have peer relations with each other, an exception is generated. For this, the virtualization layer unit 120 grasps the memory region that is shared whenever the hypercall is made for the memory sharing between the domains, and controls the page descriptor of the shared memory to be set to "read only". The exception means, from a hardware standpoint, to prepare a standard of exception handling in an unexpected situation. For example, in the case of an ARM processor, five exception handling steps are provided, and an exception handling vector for properly coping with the unexpected situation is set for each step. In catching and handling the exception event, the virtualization layer unit 120 can quickly find out by what domain a specified address can be accessed by searching the memory-sharing information table that manages a memory-sharing state among the domains.

In contrast, the virtualization layer unit 120 performs a switching of a page table in a domain-switching process by differently applying the page table setting for each domain. For example, if the first domain 140 intends to write a register containing its own pages or the contents of the pages in a memory of a network device, the virtualization layer unit 120 switches over to the page table of the first domain 140.

In the case where a domain having a driver of a peripheral device (hereinafter referred to as a "driver domain") shares the peripheral device with other domains as an exceptional case, it is required to transmit the secure data of other domains to the outside. In this case, other domains transfer the encrypted data to the driver domain, and an external computer that receives the data decrypts the data.

The above-described secure data tracking/protecting mechanism should be supported at a processor level.

The processor according to the present embodiment of the present invention roughly performs two kinds of works, loading of data from a memory and storing of data in the memory.

First, in the case of loading data from the memory, the processor checks the page mark of a source memory page to be read, and if the page is marked as a result of checking, it marks the corresponding register, and stores the ID of the domain having the secure data as a register tag.

Second, in the case of storing data in the memory, the processor confirms whether the secure data is stored by checking the register mark of the source register that keeps the data to be stored. If the secure data is stored as a result of confirmation, the processor checks whether a write-prevention flag is set in the page of the memory region in which the data is to be written. If the write prevention is set, the processor generates a system exception, while if not, the processor marks a target memory page in which the contents are written.

In contrast, if the secure data is not stored as a result of checking the register mark, the processor operates in the same manner as a general memory-paging system.

In contrast, if a direct write is attempted by a DMA (Direct Memory Access) controller instead of the memory access performed by the processor, the DMA controller supports the above-described access control.

In order to prevent the second domain 160 from reprocessing the secure data of the first domain 140 into data of a different type, storing the result of reprocessing in another memory page, and then sharing the memory with the third domain 180, whether the secure data has been reprocessed may be tracked. Specifically, the virtualization layer unit 120 marks the register that contains the operation result of the marked register. Also, the process checks the tag of the marked register that corresponds to the operation source, and if the corresponding domain is different from the domain currently performing the reprocessing, it generates an exception. In this case, the virtualization layer unit 120 returns a failure to the second domain 160.

In the present embodiment of the present invention, the second domain 160 and the third domain 180 are provided. However, a plurality of second domains and third domains may be provided.

Figure 2:
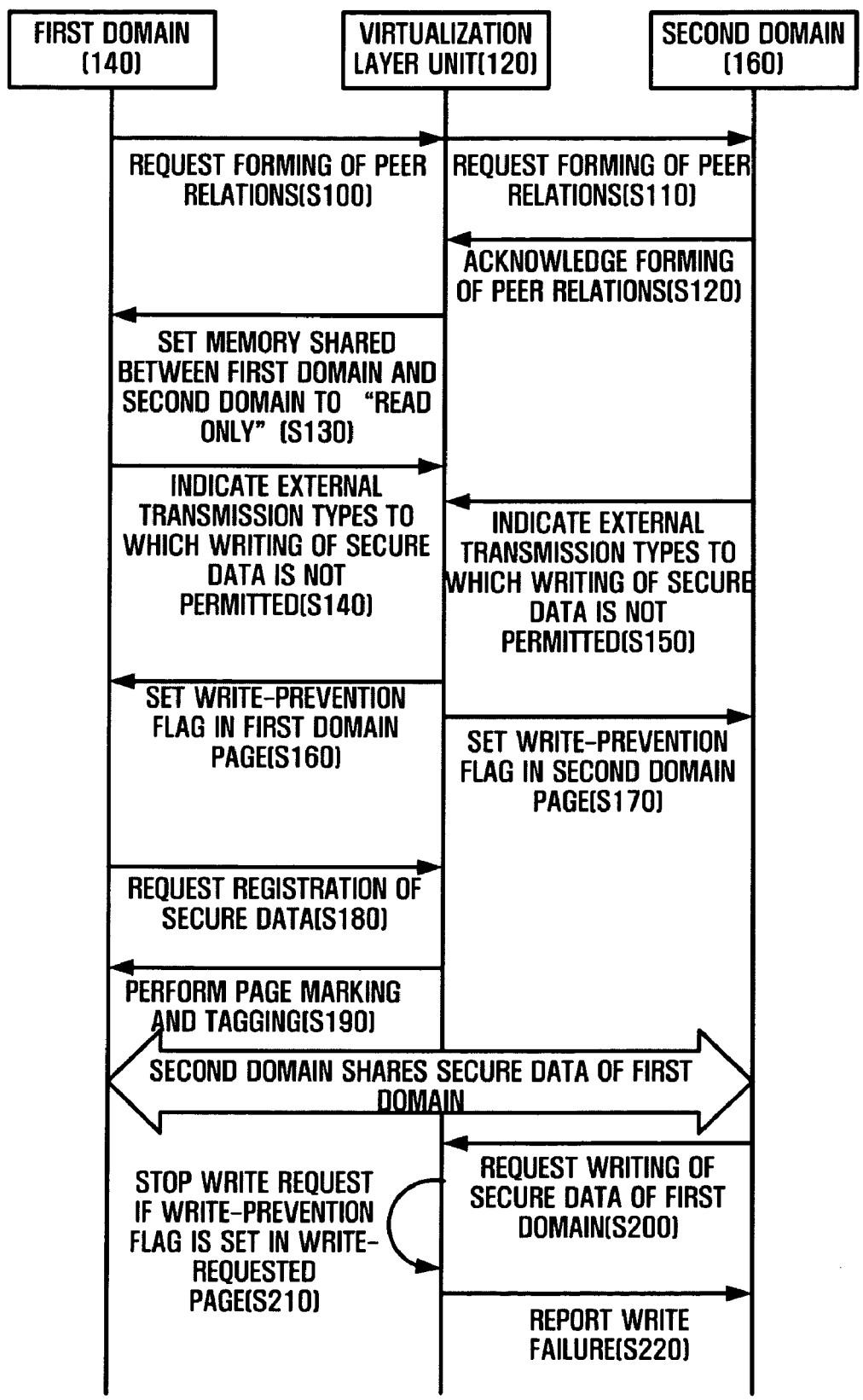
FIG. 2 is a flowchart illustrating a method of securely sharing content according to an exemplary embodiment of the present invention.

FIG. 2 is a flowchart illustrating a method of securely sharing content according to an embodiment of the present invention. In this embodiment the first domain 140 and the second domain 160 have the secure data, respectively.

The peer relations between the first domain 140 and the second domain 160 are first formed, and in this case, the virtualization layer unit 120 forms the peer relations only when the two domains agree to form the peer relations S100, S110, and S120.

The virtualization layer unit 120 controls the memory shared between the first domain 140 and the second domain 160 to be set to "read only" S130.

Also, the first domain 140 and the second domain 160 inform the virtualization layer unit 120 of the external transmission types that are not permitted to write the secure data owned by the first and second domains S140 and S150.

At this time, the virtualization layer unit 120 operates to set write-prevention flags in memory page descriptors of the peripheral devices that correspond to the external transmission type to which writing is not permitted S160 and S170.

If the first domain 140 requests the registration of the secure data (at this time, a start address and an end address of the data are inputted) S180, the virtualization layer unit 120 marks and tags all pages between the start address and the end address S190. At this time, pages already marked are prevented from being marked again.

In this state, the second domain 160 can share the secure data of the first domain 140.

In contrast, if the second domain 160 requests to write the data of the first domain 140, the virtualization layer unit 120 can confirm whether the write-requested data is the secure data and which is the domain having the secure data through a page mark, a page tag, a register mark, and a register tag.

If the write-requested data is the secure data of the first domain 140 that is not owned by the second domain 160 S200, the virtualization layer unit 120 checks whether the write-prevention flag is set in the page descriptor of the write-requested memory region.

If the write-prevention flag is set in the page descriptor of the write-requested memory region, the virtualization layer unit 120 operates to generate an exception S210 and S220.

By contrast, if the write-prevention flag is not set in the page descriptor of the write-requested memory region, the virtualization layer unit 120 operates to write the secure data of the first domain 140 in the corresponding memory region.

In contrast, if the data write-requested by the second domain 160 is not the secure data of the first domain 140, but is general data, the virtualization layer unit 120 operates to write the general data.

In the case of operating the secure data of the domains having peer relations with each other, an exception may occur. However, if mutual peer relations are formed between the two domains during processing of the exception through the virtualization layer unit 120, the virtualization layer unit permits the operation, while if not, the virtualization layer unit may transfer the exception to the domain that intended to perform the corresponding operation. In this case, a master domain can have the result of the operation.

However, the third domain 180 that does not have the peer relations cannot access the shared memory between the first domain 140 and the second domain 160.

In contrast, it departs from the scope of the present invention that the first domain 140 and the second domain 160 operate through different computers.

Accordingly, if a specified domain intends to write the secure data that is not owned by the specified domain in the memory region in which the write-prevention flag is set, such writing can be prevented.

As described above, according to the method and system for securely sharing content according to the present invention, the content can be securely shared without allowing another party unauthorized to access the content.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of securely sharing content in a system including a hardware platform, comprising:
   a first domain, which has content that requires security, among a plurality of domains logically generated on the hardware platform by a virtualization layer unit, sharing the content with at least one second domain of the plurality of domains, wherein the sharing comprises indicating, by the first domain, to the virtualization layer unit, an external transmission type to which writing of the content of the first domain is not permitted and setting a write-prevention flag in a memory page descriptor of a peripheral device, among a plurality of peripheral devices, corresponding to the external transmission type to which writing of the content of the first domain is not permitted, the plurality of peripheral devices including a peripheral device to which writing of the content owned by the first domain is permitted; and
   preventing, by the virtualization layer unit, the writing of the content if the second domain requests to write the content in a region and if the virtualization layer unit determines, based on the request of the second domain, that the flag is set for the region in which the second domain requests to write the content.

2. The method of claim 1, wherein the sharing comprises marking pages of a memory sharing the content so as to indicate that the content is stored in the pages of the memory, and tagging information of the first domain that is the domain having the content.

3. The method of claim 2, wherein the sharing comprises when the content stored in the marked pages is loaded in processor registers, including a mark indicating that the content is stored in the respective registers and a tag having information of the first domain that is the domain having the content in the respective registers.

4. The method of claim 2, further comprising limiting a change of the domain having the marked pages.

5. The method of claim 1, wherein the second domain is a domain having peer relations with the first domain.

6. The method of claim 1, wherein the external transmission type includes any one of printing, displaying, and networking.

7. The method of claim 1, wherein the region includes memory regions shared by a domain that does not have peer relations with the first domain.

8. The method of claim 6, wherein the flag indicates a memory region of a peripheral device in which the writing of the content is not permitted;
wherein the preventing comprises preventing the writing of the content in the memory region.

9. The method of claim 7, wherein the flag indicates a memory region of the memory regions,
wherein the preventing comprises preventing the writing of the content in the memory region.

10. The method of claim 1, wherein the sharing comprises setting a memory sharing of the content to "read only".

11. The method of claim 3, further comprising when the content is operated, comparing the tag of a register in which the content is stored with the tag of an operation result register, and if the tags are not the same, stopping an operation process.

12. A system for securely sharing content, comprising:
a hardware platform; and
a virtualization layer unit which logically generates a plurality of domains on the hardware platform;
wherein the plurality of domains include a first domain having content that requires security and at least one second domain sharing the content with the first domain; and
wherein the virtualization layer unit receives, from the first domain, information on an external transmission type to which writing of the content of the first domain is not permitted and sets a write-prevention flag in a memory page descriptor of a peripheral device, among a plurality of peripheral devices, corresponding to the external transmission type to which writing of the content is not permitted, the plurality of peripheral devices including a peripheral device to which writing of the content owned by the first domain is permitted, and if the second domain requests to write the content in a region and if the virtualization layer unit determines, based on the request of the second domain, that the flag is set for the region in which the second domain requests to write the content, the virtualization layer unit prevents the writing of the content.

13. The system of claim 12, wherein the virtualization layer unit marks pages of a memory sharing the content so as to indicate that the content is stored in the pages of the memory, and tags information of the first domain that is the domain having the content.

14. The system of claim 13, wherein the virtualization layer unit operates to include a mark indicating that the content is stored in processor registers and a tag having information of the first domain that is the domain having the content in the respective registers when the content stored in the marked pages is loaded in the processor registers.

15. The system of claim 13, wherein the virtualization layer unit limits a change of the domain having the marked pages.

16. The system of claim 12, wherein the second domain is a domain having peer relations with the first domain.

17. The system of claim 12, wherein the external transmission type includes any one of printing, displaying, and networking.

18. The system of claim 12, wherein the region includes memory regions shared by a domain that does not have peer relations with the first domain.

19. The system of claim 17, wherein the virtualization unit operates to set the flag indicating a memory region of the peripheral device in which the writing of the content is not permitted, and to prevent the writing of the content in the memory region.

20. The system of claim 18, wherein the virtualization unit operates to set the flag indicating a memory region of the memory regions, and to prevent the writing of the content in the memory region.

21. The system of claim 12, wherein the virtualization layer unit sets a memory sharing of the content to "read only".

22. The system of claim 14, wherein the virtualization layer unit compares the tag of the register in which the content is stored with the tag of an operation result register when the content is operated, and if the tags are not equal to each other, the virtualization layer unit stops an operation process.

* * * * *